US012089031B2

(12) United States Patent
Zhang et al.

(10) Patent No.: US 12,089,031 B2
(45) Date of Patent: Sep. 10, 2024

(54) METHOD FOR DETERMINING A WEARING STATE OF AN EARPHONE, AND EARPHONE SYSTEM

(71) Applicant: Robert Bosch GmbH, Stuttgart (DE)

(72) Inventors: Rui Zhang, Wannweil (DE); Bharath Kataveranahalli Ranganathappa, Reutlingen (DE); Hanna Beuchert, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 78 days.

(21) Appl. No.: 17/913,504

(22) PCT Filed: Jun. 8, 2021

(86) PCT No.: PCT/EP2021/065221
§ 371 (c)(1),
(2) Date: Sep. 22, 2022

(87) PCT Pub. No.: WO2022/008146
PCT Pub. Date: Jan. 13, 2022

(65) Prior Publication Data
US 2023/0148111 A1 May 11, 2023

(30) Foreign Application Priority Data
Jul. 10, 2020 (DE) ..................... 10 2020 208 682.6

(51) Int. Cl.
*H04R 5/02* (2006.01)
*H04R 1/10* (2006.01)
*H04S 7/00* (2006.01)

(52) U.S. Cl.
CPC ........... *H04S 7/304* (2013.01); *H04R 1/1008* (2013.01); *H04R 1/1041* (2013.01); *H04R 2460/03* (2013.01)

(58) Field of Classification Search
CPC ..... H04S 7/304; H04R 1/1008; H04R 1/1041; H04R 2460/03
(Continued)

(56) References Cited

U.S. PATENT DOCUMENTS 9,998,817 B1 6/2018 Liu
10,045,111 B1 8/2018 Bonner et al.
(Continued)

FOREIGN PATENT DOCUMENTS

CN 105491469 A 4/2016
CN 108600886 A 9/2018
(Continued)

OTHER PUBLICATIONS

International Search Report for PCT/EP2021/065221, Issued Sep. 15, 2021.

*Primary Examiner* — Ammar T Hamid
(74) *Attorney, Agent, or Firm* — NORTON ROSE FULBRIGHT US LLP; Gerard A. Messina

(57) ABSTRACT

A method for determining a wearing state of an earphone. Acceleration data are acquired using an acceleration sensor. A time characteristic of the acceleration data is ascertained, and curve segments are ascertained. The curve segments are each formed by first and second sections. A first wearing state of the earphone is determined, in which the earphone is worn on the ear, if a curve segment including a first section having a positive course and a second section having a negative course is ascertained, and if a first characteristic shape is ascertained for the curve segment. A second wearing state of the earphone is determined, in which the earphone is not worn on the ear, if a curve segment including a first section having a negative course and a second section having a positive course is ascertained, and if a second characteristic shape is ascertained for the curve segment.

7 Claims, 3 Drawing Sheets

(58) Field of Classification Search
USPC .................................................... 381/309, 74
See application file for complete search history.

(56) References Cited

U.S. PATENT DOCUMENTS

| | | | | |
|---|---|---|---|---|
| 10,306,350 | B1 | 5/2019 | Lin et al. | |
| 2007/0274530 | A1 | 11/2007 | Buil et al. | |
| 2009/0154720 | A1 | 6/2009 | Oki | |
| 2014/0016803 | A1 | 1/2014 | Puskarich | |
| 2014/0086438 | A1* | 3/2014 | Tachibana ............ | H04R 29/001 381/74 |
| 2015/0078573 | A1 | 3/2015 | Nicholson | |
| 2015/0281421 | A1 | 10/2015 | Yang | |
| 2016/0205475 | A1 | 7/2016 | Shanmugam et al. | |
| 2017/0244821 | A1 | 8/2017 | Ishida et al. | |

FOREIGN PATENT DOCUMENTS

| | | | |
|---|---|---|---|
| CN | 108769853 | A | 11/2018 |
| CN | 109257674 | A | 1/2019 |
| CN | 109413555 | A | 3/2019 |
| CN | 110505550 | A | 11/2019 |
| KR | 20140079214 | A | 6/2014 |

* cited by examiner

METHOD FOR DETERMINING A WEARING STATE OF AN EARPHONE, AND EARPHONE SYSTEM

BACKGROUND INFORMATION

Earphones worn on the head allow the user convenient access to diverse audio content, such as playback of music, podcasts or telephone conversations. Sometimes, interactive audio content is also offered for playback, using headphones; the content being adapted to the orientation of the head of the user. This requires that the orientation of the head of the user be determined, which is typically accomplished with the aid of inertial measuring systems integrated into the earphone.

In addition, earphones often have a function for detecting a wearing state. To this end, the earphones typically have separate sensors, by which it may be detected whether or not the earphone is being worn on the ear. The detection of the wearing state allows, e.g., the device to be switched on and off automatically, through which the power consumption may be kept low.

A method for detecting the wearing state of earphones is based on the detection of contact between the earphone and the ear, which may be ascertained with the aid of pressure, temperature, distance, or different biological sensors. Such methods are described, e.g., in U.S. Patent Application Publication Nos. US 2007/0274530 A1, US 2009/0154720 A1 and US 2014/0016803 A1, U.S. Pat. Nos. 9,998,817 B and 10,045,111 B, and Korea Patent Application KR 2014 0079214 A.

In other methods, a distance measurement, which is carried out by optical, distance, or proximity sensors, is made between the device and the ear. Such methods are described, e.g., in China Patent Application Nos. CN 108600886 A and CN 109257674 A, U.S. Pat. No. 10,306,350 B, and U.S. Patent Application Publication Nos. 2015/0281421 A1, and US 2017/0244821 A1.

Methods for determining the wearing state of earphones, which combine the detection methods mentioned above, are described in U.S. Patent Application Publication No. US 2016/0205475 A1, China Patent Application No. CN 108769853 A, U.S. Patent Application Publication No. US 2015/0078573 A1, and China Patent Application No. CN 105491469 A.

SUMMARY

The present invention provides a method and an earphone system.

According to a first aspect of the present invention, a method for determining a wearing state of an earphone is provided. According to an example embodiment of the present invention, the method includes the following steps:

- acquiring acceleration data of the earphone with the aid of an acceleration sensor integrated in the earphone;
- ascertaining a time characteristic of the acceleration data, where the magnitude of the acceleration due to gravity is subtracted from a magnitude of the acceleration data;
- ascertaining curve segments from the time characteristic of the acceleration data, where the curve segments are each formed by a first section and a second section directly following it chronologically, and the first section and the second section are each defined by the curve of the acceleration data between two consecutive zero crossings of the time characteristic of the acceleration data;

- determining a first wearing state of the earphone, in which the earphone is worn on the ear, if a curve segment including a first section having a positive course and a second section having a negative course is ascertained, and if a first characteristic shape is ascertained for the curve segment; and
- determining a second wearing state of the earphone, in which the earphone is not worn on the ear, if a curve segment including a first section having a negative course and a second section having a positive course is ascertained, and if a second characteristic shape is ascertained for the curve segment.

According to a second aspect of the present invention, an earphone system is provided. According to an example embodiment of the present invention, the earphone system includes an earphone having an audio module, which is configured to output an audio signal, and having a sensor device with an acceleration sensor, which is configured to measure an acceleration of the earphone; and a processor device, which is configured to induce the earphone to execute a method according to the present invention.

One feature of the present invention is to detect a wearing state of an earphone on the ear or not on the ear, by analyzing an acceleration signal of an acceleration sensor of the earphone. In particular, a movement of the earphone, which corresponds to "putting into the ear," that is, bringing the earphone to the ear, or a movement, which corresponds to "taking out of the ear," that is, leading the earphone away from the ear, is detected in light of a time characteristic of the acceleration signal.

The bringing of the earphone to the ear and the leading of the earphone away from the ear may be subdivided, for example, into four phases. While bringing the earphone to the ear, it is assumed that the user initially grips the earphone, which produces vibrations in the acceleration signal. In a second phase, the user lifts the earphone, which results in a marked acceleration in the direction of the ear that is typically opposite to the direction of the acceleration due to gravity. In a third phase, the earphone is lead slowly to the ear; due to the reduction in speed of the movement; an acceleration being detectable, which is pointed in the opposite direction of the acceleration in the second phase and, therefore, in the direction of gravitational acceleration. In a fourth phase, the earphone is put into the ear or placed over the ear, which is detectable, in turn, as vibrations in the acceleration signal. The operation of leading the earphone away from the ear may be described in an analogous manner. In a first phase, in which the earphone is detached from the ear, vibrations are produced in the acceleration signal. In a second phase, the earphones are removed from the ear, which is detectable as a marked acceleration in the acceleration signal; the acceleration typically being directed substantially along the direction of gravitational acceleration. In a third phase, the movement slows down, which means that a negative acceleration in the opposite direction is present in the acceleration signal. Finally, the earphone is laid down, inserted into a pocket, or stowed away in another manner; vibrations normally being produced while stabilizing the earphone in the new position.

In particular, an example embodiment of the present invention intends for the second and third phases to be ascertained in light of the time characteristic of the acceleration signal. To this end, a magnitude of the acceleration data is ascertained, and the magnitude of the acceleration due to gravity is subtracted from the magnitude of the acceleration data. Due to this, a positive or negative acceleration signal is ascertained as a function of the acceleration direction. Although the direction of gravity points downwards (in the direction of the center of the earth), a force of gravity actually measured by the acceleration sensor in the rest state is the positive reaction force exerted upwards (away from the center of the earth): +9.81 m/s$^2$. Thus, the magnitude of the acceleration data, which contain an acceleration upwards (away from the center of the earth), will have a positive algebraic sign after subtracting the measured gravitational acceleration. The magnitude of the acceleration data, which contain an acceleration downwards (in the direction of the center of the earth), will have a negative algebraic sign after subtraction of the measured gravitational force. By ascertaining zero crossings of the acceleration signal, the time characteristic may be subdivided into sections; a section being defined by the curve of the signal between two temporally consecutive zero crossings. Two consecutive sections form a curve segment of the acceleration signal. If a segment includes a section, which is chronologically first, and in which the signal characteristic is positive, and a section, which is chronologically second, and in which the signal characteristic is negative, this means that initially, an acceleration contrary to the direction of gravitational acceleration, and then, an acceleration in the direction of gravitational acceleration, have occurred. If the acceleration signal in this segment has a particular characteristic shape, then a movement of the earphone towards the ear may be deduced. Analogously, if a segment has a section, which is chronologically first, and in which the signal characteristic is negative, and a section, which is chronologically second, and in which the signal characteristic is positive, and this segment has a particular characteristic shape, then a movement of the earphone away from the ear may be deduced.

A characteristic shape may correspond, in particular, to an approximately sinusoidal, transient path of the curve segment of the acceleration signal, which differs from the course of the previous and subsequent curve segments by more than a threshold value. For example, a sum of the integrals of the sections of the segment may differ from the sum of the integrals of the previous and/or the subsequent segment by more than a limiting value.

One advantage of the present invention is that by evaluating the acceleration signal, only one acceleration sensor is necessary for determining the wearing state. Since acceleration sensors are frequently used in earphones already, e.g., in order to ascertain an orientation of the earphone, the wearing state may be determined, using a minimal number of components, and using a small amount of space required for the sensor system.

A further advantage may be that in comparison with other sensors, acceleration sensors have a low power consumption, which advantageously reduces the power demand of the earphone. In addition, an acceleration sensor is not dependent on a particular configuration within the earphone, as would be the case, e.g., with contact sensors or the like.

According to some specific example embodiments of the present invention, the first characteristic shape may be ascertained, if the curve segment satisfies one or more of the following conditions:

- a magnitude of a maximum and a magnitude of a minimum of the segment each exceed a predetermined threshold value;
- an integral of the first section of the segment with respect to time and an integral of the second section of the segment with respect to time each exceed a predetermined threshold value;
- a duration of the segment exceeds a predetermined threshold value;
- a sum of the magnitudes of the maximum and minimum of the segment is greater than a sum of the magnitudes of a maximum and minimum of a segment directly preceding it chronologically and of a segment directly following it chronologically;
- a sum of the integrals of the first and the second sections of the segment is greater than a sum of the integrals of a first and a second section of a segment directly preceding it chronologically and greater than a sum of the integrals of a first and a second section of a segment directly following it chronologically;
- the magnitudes of the maximum and minimum of the segment are not markedly smaller than in the case of a segment directly preceding it chronologically and in the case of a segment directly following it chronologically.

According to some specific example embodiments of the present invention, the second characteristic shape may be ascertained, if the curve segment satisfies one or more of the following conditions:

- a magnitude of a maximum and a magnitude of a minimum of the segment each exceed a predetermined threshold value;
- an integral of the first section of the segment with respect to time and an integral of the second section of the segment with respect to time each exceed a predetermined threshold value;
- a duration of the segment exceeds a predetermined threshold value;
- a sum of the magnitudes of the maximum and minimum of the segment is greater than a sum of the magnitudes of a maximum and minimum of a segment directly preceding it chronologically and of a segment directly following it chronologically;
- a sum of the integrals of the first and the second sections of the segment is greater than a sum of the integrals of a first and a second section of a segment directly preceding it chronologically and greater than a sum of the integrals of a first and a second section of a segment directly following it chronologically;
- the magnitudes of the maximum and minimum of the segment are not markedly smaller than in the case of a segment directly preceding it chronologically and in the case of a segment directly following it chronologically.

The above-mentioned conditions for the first and second characteristic shapes have the advantage that they may be ascertained in a computationally simple manner and allow, at the same time, the curve segment, which represents "bringing to the ear" or "leading away from the ear," to be distinguished reliably. The computationally simple determination allows the computing power of the processor device of the earphone to be advantageously reduced, which produces advantages with regard to space and, at the same time, a further reduction in the power demand.

According to some specific example embodiments of the present invention, the determining of the time characteristic may additionally include low-pass filtering of the acquired acceleration data. For example, the frequency limit of the low-pass filter may be selected to be less than 2 Hertz, in order to suppress high-frequency sensor noise.

According to some specific example embodiments of the present invention, the earphone may be operated in a first operating mode, in which an audio module of the earphone is activated to output audio signals, if the first wearing state is determined; and the earphone may be operated in a second operating mode, in which a power consumption of the earphone is reduced in comparison with the first operating mode, if the second wearing state is determined. For example, in the second wearing state, that is, in a state removed from the ear, the audio module may be switched over from stereo output to mono output. It is also possible for the audio module to be switched off completely.

According to some specific example embodiments of the present invention, the acceleration sensor may be a triaxial acceleration sensor, which is configured to measure accelerations in three spatial directions perpendicular to each other. In this manner, further functions of the earphone may be implemented in an advantageous manner, e.g., the processor device may be configured to ascertain an orientation of the head on the basis of the acceleration signal of the triaxial acceleration sensor.

In the following, the present invention is explained with reference to the figures.

DETAILED DESCRIPTION OF EXAMPLE EMBODIMENTS

Figure 1:
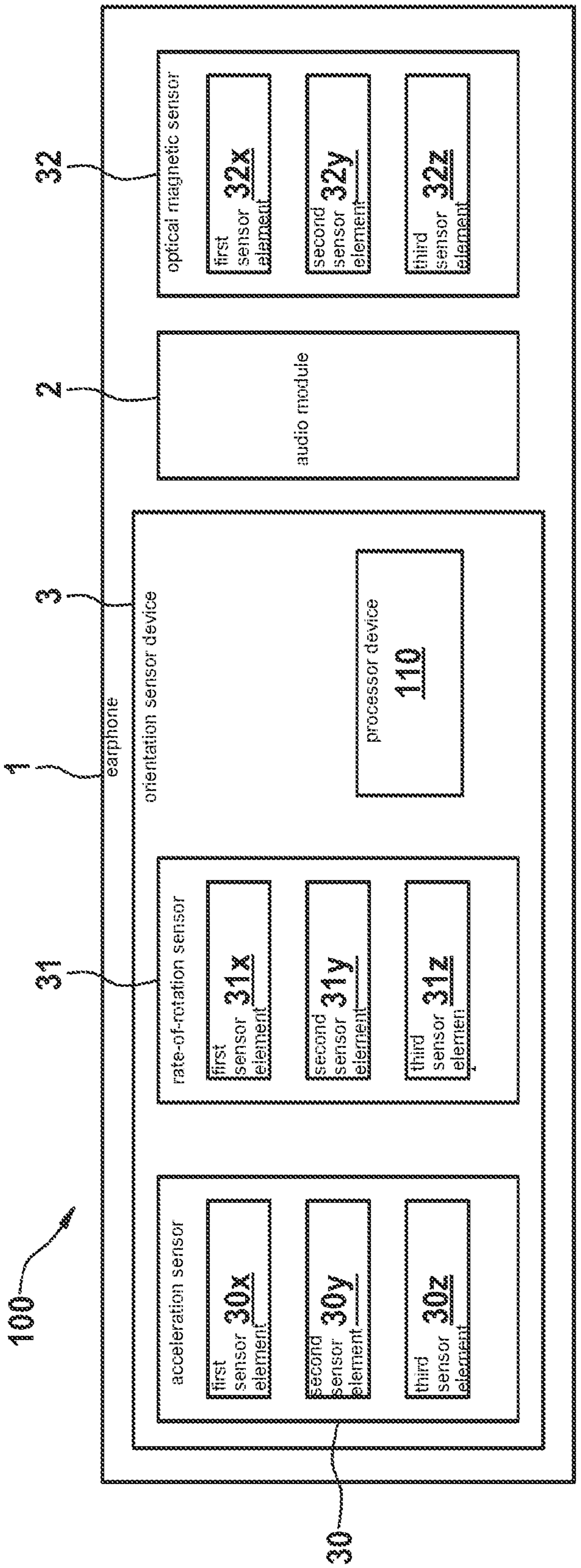
FIG. 1 shows a schematic block diagram of an earphone system according to an exemplary embodiment of the present invention.

In the figures, like or functionally equivalent components are denoted by the same reference numerals, provided that nothing to the contrary is indicated.

FIG. 1 shows, by way of example, a schematic block diagram of an earphone system 100. As shown illustratively in FIG. 1, earphone system 100 may include at least one earphone 1 and a processor device 110. For example, earphone system 100 may also include more than one earphone 1, e.g., a first and a second earphone 1. Earphone 1 may generally be produced as an in-ear earphone, which is configured to be inserted partially into the auditory canal. Alternatively, it is possible for the earphone to be implemented as an on-ear earphone or over-ear earphone, which is worn on or over the ear.

As is represented schematically in FIG. 1, earphone 1 may include an audio module 2 and an orientation sensor device 3. As shown illustratively in FIG. 1, as well, processor device 110 may be integrated in earphone 1.

Audio module 2 may include, in particular, a speaker, which is configured to output an audio signal. As an option, audio module 2 may also include a microphone (not shown), which is configured to pick up acoustic signals.

Orientation sensor device 3 may include, in particular, an acceleration sensor 30. As an option, a rate-of-rotation sensor 31 and, also optionally, a magnetic sensor 32, may additionally be provided, as is shown illustratively in FIG. 1. Accordingly, orientation sensor device 3 may include, for example, an inertial measuring unit, abbreviated as IMU. Processor device 110 may be part of orientation sensor device 3. Optional magnetic sensor 32 is preferably connected to the IMU, that is, processor device 110.

As is shown schematically in FIG. 1, acceleration sensor 30 may include a first sensor element 30*x*, which measures an acceleration along a first spatial direction, a second sensor element 30*y*, which measures an acceleration along the second spatial direction, and a third sensor element 30*z*, which measures an acceleration along a third spatial direction. Consequently, acceleration sensor 30 may be produced, for example, as a triaxial acceleration sensor, which is configured to measure accelerations in three spatial directions perpendicular to each other and to output corresponding acceleration signals.

As is further shown in FIG. 1, optional rate-of-rotation sensor 31 may include a first sensor element 31*x*, which measures a rate of rotation about the first spatial direction and/or axis, a second sensor element 31*y*, which measures a rate of rotation about the second spatial direction or axis, and a third sensor element 31*z*, which measures a rate of rotation about the third spatial direction or axis. In general, rate-of-rotation sensor 31 is configured to measure a rate of rotation of first frame of reference RF1 with regard to each of the three spatial directions x', y', z' and to output corresponding rate-of-rotation signals.

Optional magnetic sensor 32 may include a first sensor element 32*x*, which measures a magnetic field along the first spatial direction and/or axis x', a second sensor element 32*y*, which measures a magnetic field along the second spatial direction or axis y', and a third sensor element 32*z*, which measures a magnetic field along the third spatial direction or axis z'. In general, magnetic sensor 32 is configured to measure an orientation of earphone 1 relative to the terrestrial magnetic field and to output corresponding directional signals. Consequently, a type of digital compass is produced, through which the orientation of earphone 1 relative to the north magnetic pole may be ascertained.

In general, processor device 110 may include a processor and a data storage unit. For example, processor device 110 may be implemented as a microprocessor. Processor device 110 is connected to orientation sensor device 3 so as to be able to receive signals from it and may be configured, in particular, to process the signals outputted by orientation sensor device 3, in particular, in accordance with a method described in the following.

Earphone 1 may further include an energy storage device for storing electrical energy, e.g., a storage battery, to which sensor device 3 and processor device 110 are connected.

Figure 2:
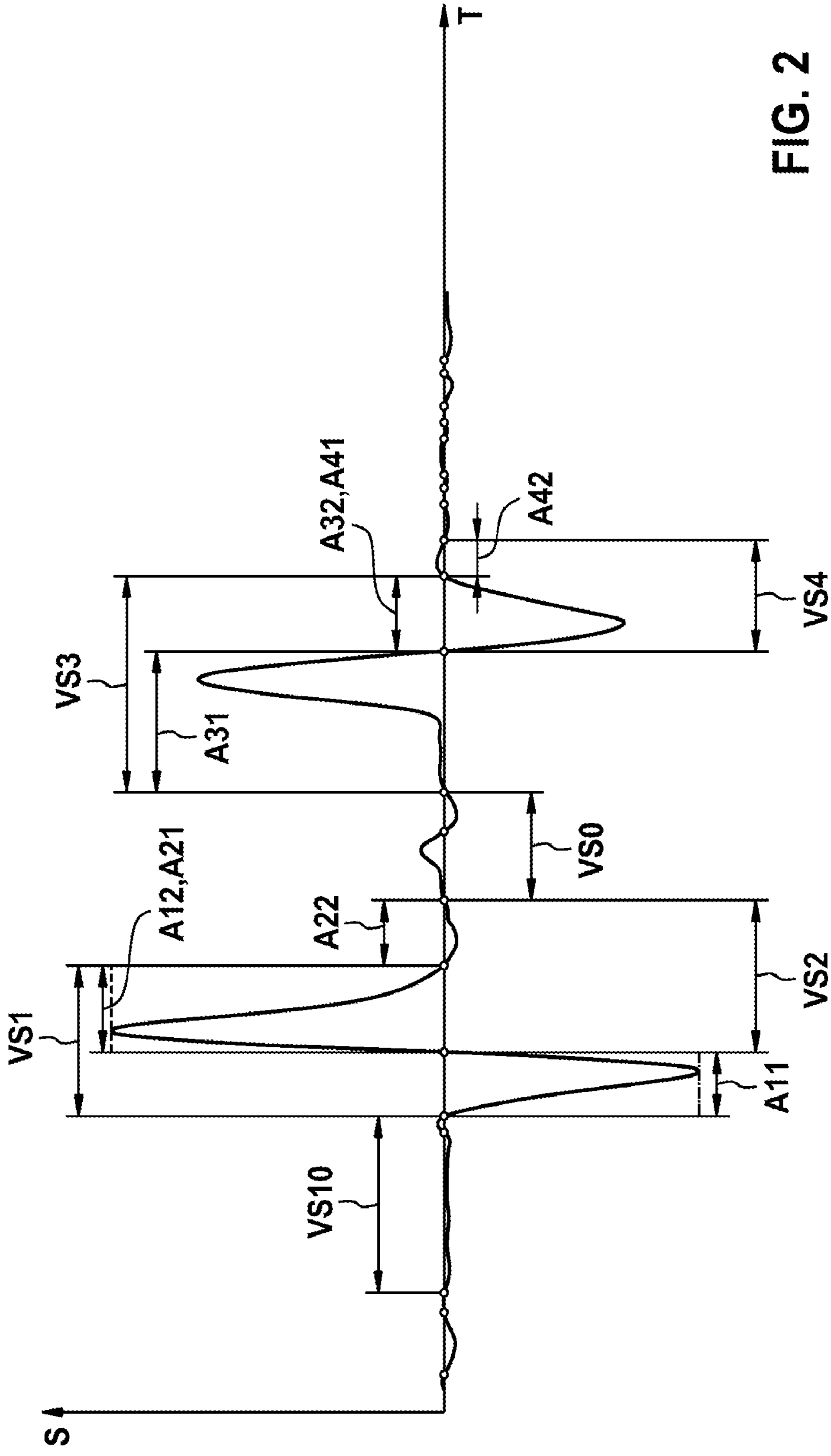
FIG. 2 shows a time characteristic of an acceleration signal, which is ascertained with the aid of an acceleration sensor of an earphone.
Figure 3:
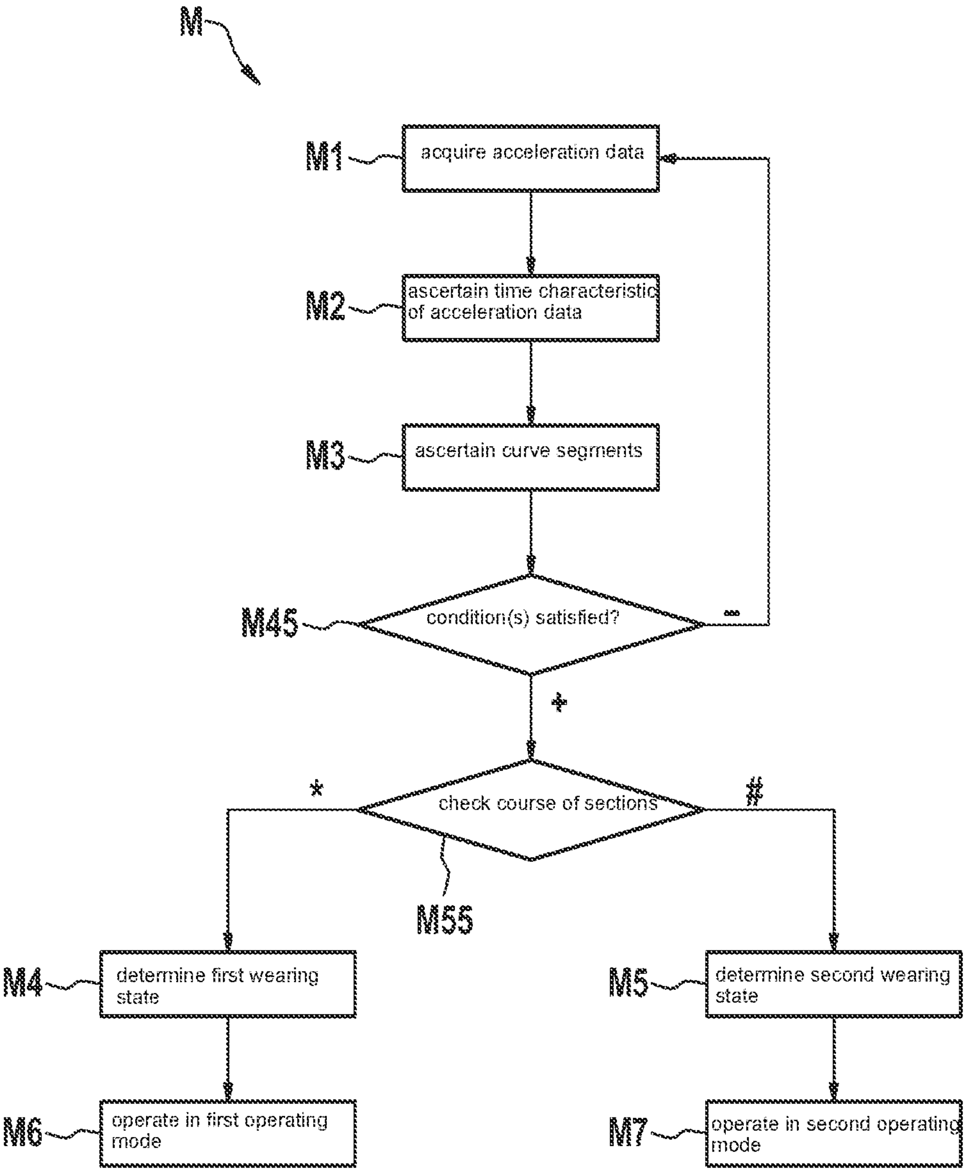
FIG. 3 shows a flow chart of a method for determining a wearing state of an earphone according to an exemplary embodiment of the present invention.

FIG. 2 shows, by way of example, a characteristic of an acceleration signal S, which is measured by acceleration sensor 30, versus time T. A flow chart of a method for determining a wearing state of an earphone 1 is shown in FIG. 3. This method M may be implemented, for example, with the aid of the earphone system 100 shown in FIG. 1; processor device 110 and acceleration sensor 30 executing the steps described below.

As shown illustratively in FIG. 3, in a first step M1, acceleration data are acquired with the aid of the acceleration sensor 30 integrated into earphone 1. The acceleration data represent an acceleration, to which earphone 1 is subjected. The acceleration data may be present, for example, in the form of a vector, in which an acceleration for three spatial directions perpendicular to each other is contained.

In a further step M2, a time characteristic of the acceleration data is ascertained. In particular, a magnitude of the acceleration data may be ascertained, and the magnitude of the acceleration due to gravity may be subtracted from the magnitude of the acceleration data. Due to this, accelerations contrary to the direction of the force of gravity, that is, away from the center of the earth, receive a positive algebraic sign, and accelerations in the direction of the force of gravity, that is, in the direction of the center of the earth, receive a negative algebraic sign. The reason for this is that in the rest state, acceleration sensor 30 measures the reaction force, which is directed contrary to the force of gravity and has a positive algebraic sign, that is, the value +9.81 m/s$^2$. As an option, low-pass filtering of the acquired acceleration data may additionally take place, e.g., using a frequency limit of the low-pass filter of less than 2 Hz, in order to suppress high-frequency sensor noise. In this manner, e.g., the characteristic shown illustratively in FIG. 2 may be ascertained. The acceleration data may be stored temporarily, for example, for a certain period of time, in a data storage unit of processor device 110.

Thus, the magnitude of acceleration data S versus time T is plotted in FIG. 2. Since, in the rest state, acceleration sensor 30 measures the reaction force, which is directed contrary to the force of gravity and has a positive algebraic sign, that is, the value 9.81 m/s$^2$, the abscissa, which is formed by time axis T, corresponds to the value of the gravitational acceleration, which is measured by acceleration sensor 30, when acceleration sensor 30 is at rest. In the case of accelerations "upwards," that is, away from the center of the earth or contrary to the direction of gravity, the magnitude of acceleration data S shown in FIG. 2 has, consequently, a positive algebraic sign. Accordingly, in the case of accelerations "downwards," that is, in the direction of the center of the earth or contrary to the direction of gravity, the magnitude of the acceleration data has a negative amount.

In a further step M3, curve segments VS1, VS2, VS3, VS4 are ascertained from the time characteristic of the acceleration data. To this end, in particular, the zero crossings of the time characteristic of the acceleration data may be determined. In this manner, the time characteristic of the acceleration data is subdivided into individual sections A11, A12, A21, A22, A31, A32, A41, A42. Each curve segment VS1, VS2, VS3, VS4 is defined by two sections A11, A12, A21, A22, A31, A32, A41, A42 directly following each other chronologically. In FIG. 2, for example, curve segment VS1 is defined by first section A11 and second section A12. The curve segment VS2 following curve segment VS1 chronologically is defined by first section A21 and second section A22; first section A21 of curve segment VS2 corresponding to second section A12 of curve segment VS1. In the same manner, curve segment VS3 is defined by first section A31 and second section A32. The curve segment VS4 following curve segment VS3 chronologically is defined by first section A41 and second section A42; first section A41 of curve segment VS4 corresponding to second section A32 of curve segment VS3. Consequently, each curve segment VS1, VS2, VS3, VS4 is respectively formed by a first section A11, A21, A31, A41 and a second section A12, A22, A32, A42 immediately following it chronologically; and first section A11, A21, A31, A41 and second section A12, A22, A32, A42 each being defined, respectively, by the curve of the acceleration data between two consecutive zero crossings of the time characteristic of the acceleration data.

A first wearing state of earphone 1, in which earphone 1 is worn on the ear, is determined in step M4. A second wearing state of earphone 1, in which earphone 1 is not worn on the ear, is determined M5 in step M5. The wearing state of earphone 1 is determined with the aid of an evaluation of the time characteristic of the acceleration data, that is, curve segments VS1, VS2, VS3, VS4, in steps M45 and M55.

The bringing of earphone 1 to the ear and the leading of earphone 1 away from the ear may be subdivided, in principle, into four phases. While bringing earphone 1 to the ear, it is assumed that the user initially grips the earphone, which produces vibrations in the acceleration signal. In FIG. 2, this is apparent, for example, from curve segment VS0. In a second phase, the user lifts earphone 1, which results in a marked acceleration in the direction of the ear that is typically opposite to the direction of the acceleration due to gravity, that is, away from the center of the earth or "upwards." This may be recognized in section A31 in FIG. 2. In a third phase, the earphone is lead slowly to the ear; due to the reduction in speed of the movement, an acceleration being detectable, which is pointed opposite to the acceleration in the second phase and, therefore, in the direction of gravitational acceleration, that is, in the direction of the center of the earth or "downwards," as is the case in section A32 in FIG. 2. In a fourth phase, the earphone is put into ear 1 or placed over the ear, which is detectable, in turn, as vibrations in the acceleration signal, as is apparent in FIG. 2 in section A42 and the sections succeeding it chronologically. The operation of leading earphone 1 away from the ear is analogously recognizable from the characteristic of the acceleration data shown illustratively in FIG. 2. In a first phase, in which earphone 1 is detached from the ear, vibrations occur in the acceleration signal, as can be seen in segment VS10 in FIG. 2. In a second phase, earphone 1 is removed from the ear, which is detectable as a marked acceleration in the acceleration signal (section A11 in FIG. 2); the acceleration typically being pointed substantially along the direction of gravitational acceleration, that is, in the direction of the center of the earth or "downwards." In a third phase, the movement slows down, which means that a negative acceleration in the opposite direction, that is, an acceleration away from the center of the earth or "upwards," is present in the acceleration signal, as is apparent from section A12 of curve segment VS1 in FIG. 2. Finally, earphone 1 is laid down, inserted into a pocket, or stowed away in another manner; vibrations normally being produced while stabilizing the earphone in the new position.

In a stationary state of earphone 1, the magnitude of the acceleration signal corresponds to the acceleration due to gravity. As is apparent from the characteristic illustratively shown in FIG. 2, the magnitude of the acceleration signal oscillates about the magnitude of the gravitational acceleration, when earphone 1 is brought to the ear (curve segment VS3 in FIG. 2) and when earphone 1 is lead away from the ear (curve segment VS1 in FIG. 2), so that the signal resembles a period of a sinusoidal signal. Therefore, the wearing state may be determined by ascertaining a characteristic shape of a curve segment in the form of a transient, approximately sinusoidal signal, which stands out markedly from the preceding and subsequent acceleration signals.

Consequently, in step M45 of method M, a curve segment VS1, VS2, VS3, VS4 having a first characteristic shape or a second characteristic shape is ascertained from the time characteristic of the acceleration signal. Ascertaining a curve segment VS1, VS2, VS3, VS4 having a first characteristic shape or a second characteristic shape may include, for example, integrating individual sections A11, A12, A21, A22, A31, A32 with respect to time and/or determining the maxima and minima of the magnitudes of sections A11, A12, A21, A22, A31, A32 and/or ascertaining a duration of sections A11, A12, A21, A22, A31, A32. A curve segment having a first or a second characteristic shape may be detected, if one or more of the following conditions are satisfied:

- a magnitude of a maximum and a magnitude of a minimum of the segment each exceed a predetermined threshold value;

an integral of the first section of the segment with respect to time and an integral of the second section of the segment with respect to time each exceed a predetermined threshold value;

a duration of the segment exceeds a predetermined threshold value;

a sum of the magnitudes of the maximum and minimum of the segment is greater than a sum of the magnitudes of a maximum and minimum of a segment directly preceding it chronologically and of a segment directly following it chronologically;

a sum of the integrals of the first and the second sections of the segment is greater than a sum of the integrals of a first and a second section of a segment directly preceding it chronologically and greater than a sum of the integrals of a first and a second section of a segment directly following it chronologically;

the magnitudes of the maximum and minimum of the segment are not markedly smaller than in the case of a segment directly preceding it chronologically and in the case of a segment directly following it chronologically.

The presence of one or more of these conditions is checked in step M45. If one or more of these conditions are not satisfied, the method returns to step M1, as is shown in FIG. 3 by the symbol "—." If one or more of these conditions are satisfied, step M55 is executed next, as is shown in FIG. 3 by the symbol "+." In FIG. 2, curve segments VS1 and VS3 satisfy, for example, one or more of these conditions.

In step M55, it is checked if curve segment VS1, VS2, VS3, VS4, which has the characteristic shape, includes a first section A11, A21, A31, A41 having a positive path and a second section A12, A22, A32, A42, which directly follows it chronologically and has a negative path. In FIG. 2, this case corresponds to curve segment VS3. As already explained above, curve segment VS3 represents bringing earphone 1 to the ear. Accordingly, as indicated in FIG. 3 by the symbol "*," it is then determined, in step M4, that a first wearing state of earphone 1 is present, in which earphone 1 is worn on the ear.

In step M55, it is also checked if curve segment VS1, VS2, VS3, VS4, which has the characteristic shape, includes a first section A11, A21, A31, A41 having a negative path and a second section A12, A22, A32, A42, which directly follows it chronologically and has a positive path. In FIG. 2, this case corresponds to curve segment VS1. As already explained above, curve segment VS1 represents leading the earphone 1 away from the ear. Accordingly, as indicated in FIG. 3 by the symbol "#," it is then determined, in step M5, that a first wearing state of earphone 1 is present, in which earphone 1 is worn on the ear.

As an option, if the first wearing state is determined, then, in step M6, the earphone may be operated in a first operating mode, in which audio module 2 of earphone 1 is activated for outputting audio signals. This may correspond, for example, to switching on audio module 2 automatically. In the same manner, in the optional step M7, earphone 1 may be operated in a second operating mode, in which a power consumption of earphone 1 is reduced in comparison with the first operating mode, if the second wearing state is determined. For example, the audio module and, optionally, further components of the earphone, may be switched off in step M7.

Although the present invention has been explained above by way of example, using exemplary embodiments, it is not limited to them, but may be modified in various ways. In particular, combinations of the exemplary embodiments mentioned above are also possible.

What is claimed is:

1. A method for determining a wearing state of an earphone, comprising:

acquiring acceleration data of the earphone using an acceleration sensor integrated in the earphone;

ascertaining a time characteristic of the acceleration data, where a magnitude of the acceleration due to gravity is subtracted from a magnitude of the acceleration data;

ascertaining curve segments from the time characteristic of the acceleration data, each of the curve segments being respectively formed by a first section and a second section immediately following the first section chronologically, wherein the first section and the second section each being defined by a curve of the acceleration data between two consecutive zero crossings of the time characteristic of the acceleration data;

determining a first wearing state of the earphone, in which the earphone is worn on the ear, when the first section of a curve segment of the curve segments has a positive course and the second section of the curve segment has a negative course, and when the curve segment has a first characteristic shape; and determining a second wearing state of the earphone, in which the earphone is not worn on the ear, when the first section of a curve segment of the curve segments has a negative course and the second section of the curve segment has a positive course, and when the curve segment has a second characteristic shape.

2. The method as recited in claim 1, wherein the curve segment has the first characteristic shape when the curve segment satisfies one or more of the following conditions:

a magnitude of a maximum and a magnitude of a minimum of the curve segment each exceed a predetermined threshold value;

an integral of the first section of the curve segment with respect to time and an integral of the second section of the curve segment with respect to time each exceed a predetermined threshold value;

a duration of the curve segment exceeds a predetermined threshold value;

a sum of the magnitudes of the maximum and minimum of the curve segment is greater than a sum of the magnitudes of the maximum and minimum of a curve segment directly preceding the curve segment chronologically and of a curve segment directly following the curve segment chronologically;

a sum of the integrals of the first and the second section of the curve segment is greater than a sum of the integrals of the first and the second section of a curve segment directly preceding the curve segment chronologically and greater than a sum of the integrals of the first and the second section of a curve segment directly following the curve segment chronologically;

the magnitudes of the maximum and minimum of the curve segment are not markedly smaller than a curve segment directly preceding the curve segment chronologically and in the case of a curve segment directly following the curve segment chronologically.

3. The method as recited in claim 1, wherein the curve segment has the characteristic shape when the curve segment satisfies one or more of the following conditions:

a magnitude of a maximum and a magnitude of a minimum of the curve segment each exceed a predetermined threshold value;

an integral of the first section of the curve segment with respect to time and an integral of the second section of the curve segment with respect to time each exceed a predetermined threshold value;

a duration of the curve segment exceeds a predetermined threshold value;

a sum of the magnitudes of the maximum and minimum of the curve segment is greater than a sum of the magnitudes of the maximum and minimum of a curve segment directly preceding the curve segment chronologically and of a curve segment directly following the curve segment chronologically;

a sum of the integrals of the first and the second section of the curve segment is greater than a sum of the integrals of a first and a second section of a curve segment directly preceding the curve segment chronologically and greater than a sum of the integrals of a first and a second section of a curve segment directly following the curve segment chronologically;

the magnitudes of the maximum and minimum of the curve segment are not markedly smaller than in the case of a curve segment directly preceding the curve segment chronologically and in the case of a curve segment directly following the curve segment chronologically.

4. The method as recited in claim 1, wherein the ascertaining of the time characteristic additionally includes low-pass filtering of the acquired acceleration data.

5. The method as recited in claim 1, further comprising:

operating the earphone in a first operating mode, in which an audio module of the earphone is activated for outputting audio signals, based on the first wearing state being determined;

operating the earphone in a second operating mode, in which a power consumption of the earphone is reduced in comparison with the first operating mode, based on the second wearing state being determined.

6. An earphone system, comprising:

an earphone including: (i) an audio module which is configured to output an audio signal, and (ii) a sensor device including an acceleration sensor which is configured to measure an acceleration of the earphone; and a processor device configured to induce the earphone to determine a wearing state of the earphone, by:

acquiring acceleration data of the earphone using an acceleration sensor integrated in the earphone, ascertaining a time characteristic of the acceleration data, where a magnitude of the acceleration due to gravity is subtracted from a magnitude of the acceleration data, ascertaining curve segments from the time characteristic of the acceleration data, each of the curve segments being respectively formed by a first section and a second section immediately following the first section chronologically, wherein the first section and the second section each being defined by a curve of the acceleration data between two consecutive zero crossings of the time characteristic of the acceleration data, determining a first wearing state of the earphone, in which the earphone is worn on the ear, when the first section of a curve segment of the curve segments has a positive course and the second section of the curve segment has a negative course, and when the curve segment has a first characteristic shape, and determining a second wearing state of the earphone, in which the earphone is not worn on the ear, when the first section of a curve segment of the curve segments has a negative course and the second section of the curve segment has a positive course, and when the curve segment has a second characteristic shape.

7. The earphone system as recited in claim 6, wherein the acceleration sensor is a triaxial acceleration sensor, which is configured to measure accelerations in three spatial directions perpendicular to each other.

* * * * *